Nov. 12, 1940.    H. L. ROACH    2,221,266
MATERIAL SPREADER
Filed Feb. 24, 1939    2 Sheets-Sheet 1
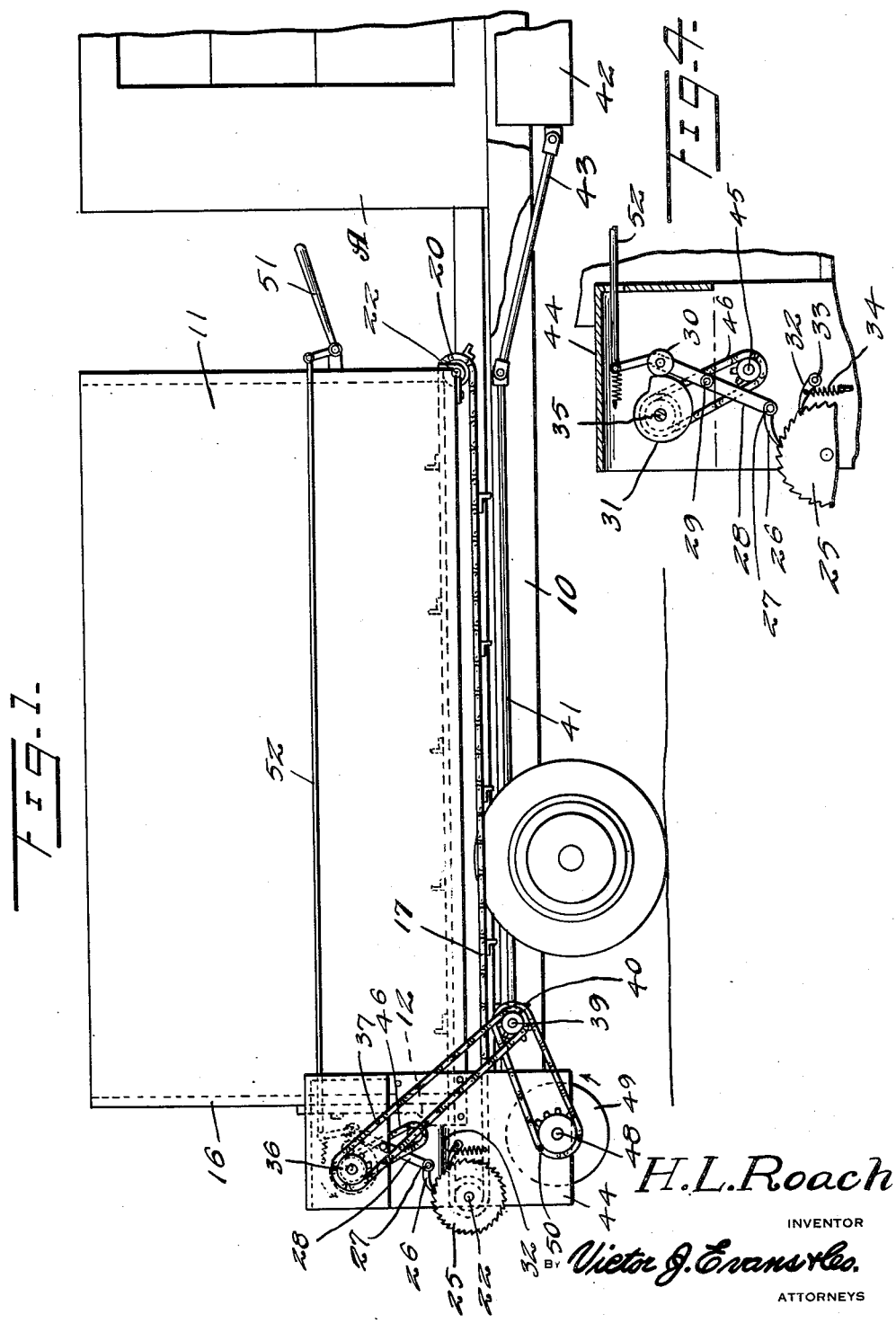
H.L.Roach
INVENTOR
BY Victor J.Evans & Co.
ATTORNEYS

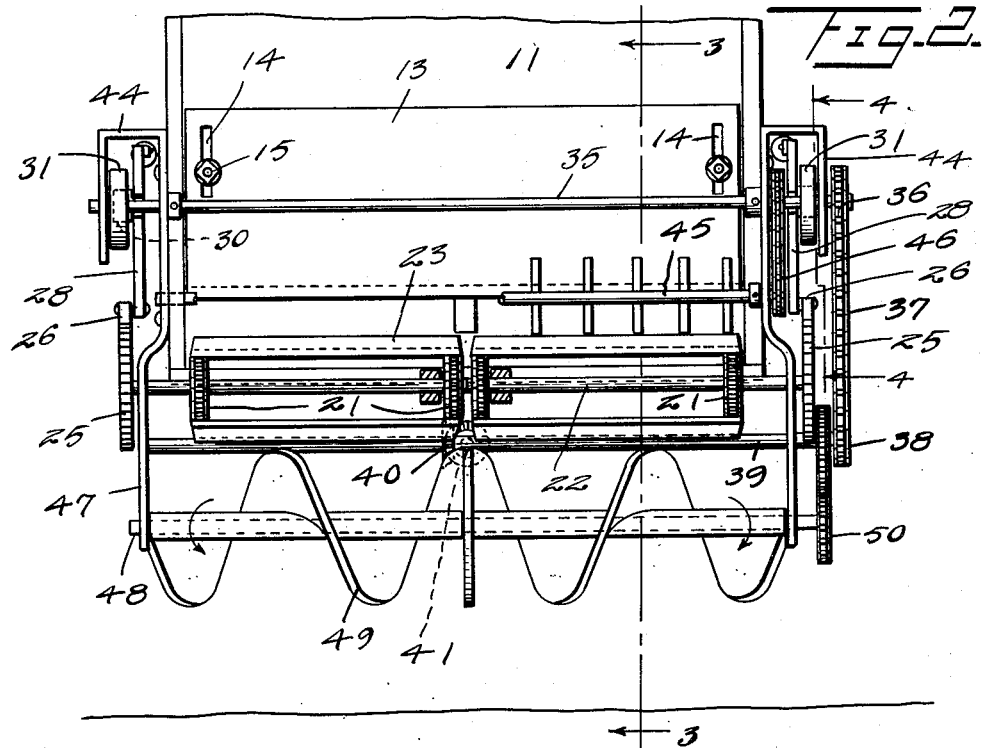
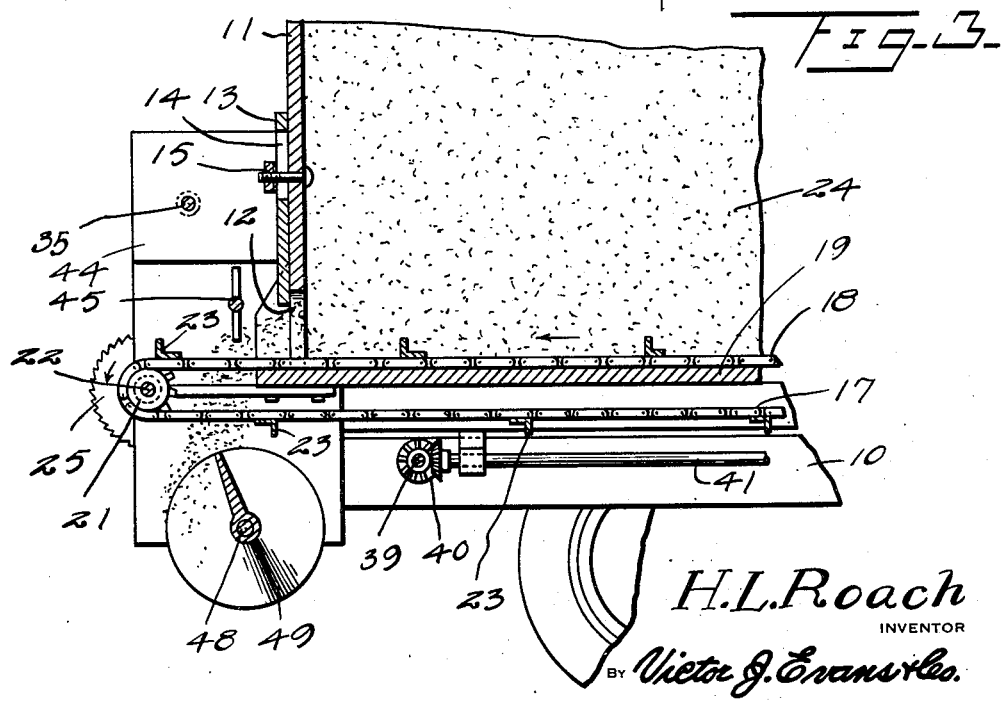

Patented Nov. 12, 1940

2,221,266

UNITED STATES PATENT OFFICE 2,221,266

MATERIAL SPREADER

Howard L. Roach, Plainfield, Iowa

Application February 24, 1939, Serial No. 258,279

3 Claims. (Cl. 275—6)

The invention relates to a material spreader and more especially to a spreader attachment for motor vehicles of the truck type.

The primary object of the invention is the provision of an attachment of this character, wherein loose or granular material contained within a box-like body upon the truck will be automatically delivered therefrom for the spreading of the material in a uniform manner at the rear of said truck, the mechanism for the spreading operation being of novel construction and the material in the discharge thereof can be regulated so as to assure the required amount of spread thereof for a determined area of ground.

Another object of the invention is the provision of an attachment of this character, wherein the driving connections for the spreader are shielded or protected to avoid the material collecting therein and thus interfering with the operation of the attachment.

A further object of the invention is the provision of an attachment of this character, wherein loose material can be spread either thin or thick on different sides of the truck having the attachment associated therewith and the material as contained within a box body upon said truck will fall through a conveyor onto a spreader without being first thrown into the latter by a beater or agitator and in this manner a uniformity of spread of the material is assured on the discharge thereof from the truck.

A still further object of the invention is the provision of an attachment of this character, wherein loose material contained as a load of a motor truck will be discharged and distributed with accuracy and a maximum spread of the material is assured during the advancement of the truck over the ground.

A still further object of the invention is the provision of an attachment of this character, which is simple in construction, thoroughly reliable and efficient in operation, receiving its power from the power unit of a truck, being automatic in the working thereof and is under the control of the operator of the truck, and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a fragmentary side elevation of a motor truck showing the spreader attachment constructed in accordance with the invention applied thereto.

Figure 2 is a fragmentary rear end elevation.

Figure 3 is a fragmentary sectional view taken on the line 3—3 of Figure 2 looking in the direction of the arrows.

Figure 4 is a fragmentary sectional view taken on the line 4—4 of Figure 2 looking in the direction of the arrows.

Similar reference characters indicate corresponding parts throughout the several views in the drawings.

Referring to the drawings in detail, A designates generally a portion of a motor truck, its load chassis frame being indicated at 10 and supports a box body 11, which is made fast thereon in any suitable manner. This body 11 at the rear end thereof is formed with a discharge mouth 12 provided with an adjustable gate 13, being preferably vertically slotted at 14 for accommodating nut-carrying bolts 15, these being fitted in the rear end wall 16 of said body 11 and in this manner the gate can be fastened in an adjusted position to regulate the discharge through the mouth 12 from the body 11, as will be clearly apparent from Figures 2 and 3 of the drawings.

Arranged longitudinally of the chassis frame 10 and movable through the discharge mouth 12 of the body 11 are spaced parallel endless drag conveyors 17, the upper stretches 18 of which are directly above the floor or bottom 19 of the body and such conveyors are arranged at opposite sides of the longitudinal center of the body 11 and have their rearmost end portions extended a distance beyond and rearwardly of the mouth 12. These conveyors 17 are of the chain type, the latter being trained over front and rear sprockets 20 and 21, respectively, upon shafts 22 fore and aft of the said body 11 and suitably journaled. The conveyors 17 are equipped with cross drag cleats 23 which advance the material 24 contained within the body 11 through the mouth 12 for the discharge of said material from the body. It is of course understood that each conveyor 17 has its fore and aft shafts 22 independent of the other so that one conveyor operates or is susceptible of movement independent of the other conveyor in the working of the attachment.

Fixed to the outer ends of both aft shafts 22 for the conveyors 17 are toothed ratchet wheels 25, each being engageable by a feeding ratchet dog or pawl 26 pivoted at 27 to a rocking lever 28, its rocking arbor being indicated at 29 and supports a cam-engaging roller 30 for a cam 31, the ratchet wheel 25 being also engaged by a locking pawl or dog 32, pivoted at 33 and held in locking or latching position by a spring 34. This pawl or dog 32 prevents back movement of the ratchet wheel 25 while the pawl or dog 26 functions for rotation of said wheel in one direction and in a step by step manner. The cams 31 are fixed to a rotatable shaft 35 journaled crosswise of the body at an elevation above the conveyors 17. The shaft 35 carries a sprocket wheel 36 over which is trained an endless sprocket chain 37 which is also trained over a sprocket wheel 38 on a driven shaft 39 having beveled gear connections 40 with a driving shaft 41 operatively connected with the transmission (not shown) of the truck A, a portion of the transmission casing being indicated at 42 while the operative connection at 43, so that the cams 31 will be driven in unison with each other and operate the arms or levers 28 for imparting intermittent motion to the conveyors 17, the intermittent motion being had through the feed pawls or dogs 26 coacting with the ratchet wheels 25 hereinbefore set forth.

Exteriorly of the body 11 at the rear end thereof and at opposite sides of said body are built thereon protective housings or shields 44 for the ratchet wheels 25, pawls or dogs 26, levers 28, cams 31 and the pawls or dogs 32 so as to prevent the material 24 when discharged from the body 11 from working into these parts and thereby eliminating interference in the operation thereof.

Rearwardly of the mouth 12 but in close proximity thereto and above the conveyors 17 is a horizontally arranged tined beater or agitator 45 operated from chain and sprocket connections 46 with the shaft 35 so that the material 24 being discharged through the mouth 12 will be broken up from mass formation and fall through the conveyors 17, as is shown in Figure 3 of the drawings. Arranged below the extended ends of the conveyors 17 and journaled in lower hanger portions 47 of the housings or shields 44 is a shaft 48 carrying a spiral spreader, being formed with reverse spirals 49, these having the reverse trends thereof carried outwardly in a lateral direction from the longitudinal center of the truck A so that the material dropped thereon from the conveyors 17 will be separately spread at opposite sides of the truck. The shaft 48 has sprocket and chain connections 50 with the shaft 39 and in this manner the spiral spreader is driven. The spreader just mentioned is horizontally disposed immediately beneath the extended ends of the conveyors 17 so that the material delivered or discharged through the mouth 12 will fall through the conveyor at its rear portion onto such spreader and in the operation thereof the material so dropped will be spread uniformly at opposite sides of the truck.

Arranged at the front end of the body 10 on each side thereof are hand operated levers 51 each having connections 52 with the lever or arm 28 companion thereto so that both of said arms or levers 28 are independent of each other and in this way the rollers 30 of these arms or levers 28 can be moved out of engagement with the cams 31 therefor and thus each of the conveyors 17 can be rendered inactive or passive. The hand levers 51 can be held in any suitable manner in positions for rendering the conveyors 17 inactive or passive.

In the operation of the attachment when the conveyors 17 are intermittently operated or moved the material 24 within the body 11 is carried through the mouth 12 and thence through the conveyor 17 falling onto the spreader which through the spiral formation thereof throws the material to the right and left and rearwardly of the truck. The attachment feeds a maximum amount of material through the mouth 12 and such mouth is controlled by the gate 13 and this material will be discharged until the load is exhausted in the body 11, there being an even flow of the material. The agitator or beater 45, which is located just above the conveyors 17, keeps the material from extruding in a mass and then breaking off in that the material is loosened should the same become clogged or caked during the operation of the attachment. The attachment is driven from the truck A at the power take-off of the transmission thereof. The material will be delivered from the truck whether the same is in motion or standing still.

The conveyors 17 are susceptible of independent motion so that when one conveyor is active the other can be passive. The material delivered from the mouth 12 of the body 11 falls directly over the spreader so that a positive and uniform spreading of the material is assured.

The material 24 is deposited within the body 11 through the open top or upper portion thereof.

What is claimed is:

1. A spreader attachment for a truck body having a rear opening and a flat closed bottom, comprising endless open conveyors arranged side by side and having their upper stretches overlying the flat bottom and extending through the said opening for a distance beyond the rear end of the truck body for the delivery of material through the extended portion of said conveyor, reversely spiraled rotatable spreaders supported directly below the portions of the conveyors extending beyond said truck body, the said spreaders being arranged with the innermost ends thereof substantially vertically aligned with the innermost sides of said conveyors, and beaters above the conveyors and adjacent to the opening.

2. A spreader attachment for a truck body having a rear opening and a flat closed bottom, comprising endless open conveyors arranged side by side and having their upper stretches overlying the flat bottom and extending through the said opening for a distance beyond the rear end of the truck body for the delivery of material through the extended portion of said conveyor, reversely spiraled rotatable spreaders supported directly below the portions of the conveyors extending beyond said truck body, the said spreaders being arranged with the innermost ends thereof substantially vertically aligned with the innermost sides of said conveyors, beaters above the conveyors and adjacent to the opening, and mechanism associated with the beaters, conveyors and spreaders for simultaneous operation thereof.

3. A spreader attachment for a truck body having a rear opening and a flat closed bottom, comprising endless open conveyors arranged side by side and having their upper stretches overlying the flat bottom and extending through the said opening for a distance beyond the rear end of the truck body for the delivery of material through the extended portion of said conveyor, reversely spiraled rotatable spreaders supported directly below the portions of the conveyors extending beyond said truck body, the said spreaders being arranged with the innermost ends thereof substantially vertically aligned with the inner most sides of said conveyors, beaters above the conveyors and adjacent to the opening, mechanism associated with the beaters, conveyors and spreaders for simultaneous operation thereof, and an adjustable gate for the said opening.

HOWARD L. ROACH.